United States Patent [19]

Arai

[11] 4,374,754

[45] Feb. 22, 1983

[54] SELF-CLEANING COATING COMPOSITIONS AND COOKING APPARATUS COATED THEREWITH

[75] Inventor: Nobushige Arai, Nara, Japan

[73] Assignee: Sharp Kabushiki Kaisha, Osaka, Japan

[21] Appl. No.: 229,522

[22] Filed: Jan. 30, 1981

Related U.S. Application Data

[63] Continuation-in-part of Ser. No. 57,106, Jul. 12, 1979, abandoned.

[30] Foreign Application Priority Data

Jul. 17, 1978 [JP] Japan ............................... 53-87424
Jul. 27, 1978 [JP] Japan ............................... 53-92388

[51] Int. Cl.$^3$ ...................... B01J 31/06; B01J 21/12
[52] U.S. Cl. ............................... 252/430; 252/455 R; 252/460; 126/19 R; 428/450
[58] Field of Search .................. 252/430, 428, 455 R, 252/454, 460; 126/19 R; 428/450

[56] References Cited

U.S. PATENT DOCUMENTS

| | | | |
|---|---|---|---|
| 3,460,523 | 8/1969 | Stiles et al. | 252/454 X |
| 3,993,597 | 11/1976 | Stiles | 252/454 |
| 4,062,806 | 12/1977 | Roberts | 252/454 X |
| 4,112,179 | 9/1978 | Maccalous et al. | 428/450 X |
| 4,163,081 | 7/1979 | Schultz | 428/450 X |
| 4,169,185 | 9/1979 | Bhatia | 428/450 |
| 4,180,482 | 12/1979 | Nishino et al. | 252/455 R |

*Primary Examiner*—Carl F. Dees
*Attorney, Agent, or Firm*—Birch, Stewart, Kolasch & Birch

[57] ABSTRACT

A self-cleaning coating film is formed using a self-cleaning coating composition including an oxidation, catalyst mixed within a composition including silicone synthetic resin and an organic solvent. The oxidation catalyst includes at least one element selected from a metal such as a noble metal and a metal oxide such as manganese dioxide, copper oxide, iron oxide, nickel oxide, chrome oxide, and the like. The metal is blended with a powder made of alumina, or the like, in the range of about 0.1 to 1.0 weight %. The diameter of the particles of the powder is on the order of about 40 to 300$\mu$. The powder is mixed with the composition in the range of about 5 to 100 weight %. The metal oxide is present in the composition at about 50 weight %. The self-cleaning coating film is formed at about 40 to 300$\mu$ thickness. The thus formed self-cleaning coating film is exposed to an elevated temperature of about 300° to 400° Centigrade for about 5 to 10 minutes, whereby the silicone synthetic resin is carbonized to form a film of $SiO_2$.

54 Claims, No Drawings

SELF-CLEANING COATING COMPOSITIONS AND COOKING APPARATUS COATED THEREWITH

CROSS REFERENCE TO RELATED APPLICATION

This application is a continuation-in-part of copending application Ser. No. 57,106, filed on July 12, 1979, now abandoned.

BACKGROUND OF THE INVENTION

1. Field of the Invention

The present invention relates to self-cleaning coating compositions which are disposed on the inner surfaces of a cooking apparatus. More particularly, the present invention relates to self-cleaning coating compositions made of silicone synthetic resin and powder containing an oxidation catalyst.

2. Brief Description of the Prior Art

Conventional self-cleaning coating compositions are, for example, disclosed in Japanese Publication No. 47-17832, published May 24, 1972 and U.S. Pat. No. 3,460,523, issued Aug. 12, 1969.

The above-mentioned prior art references include organic materials, as binder or bonding agents for the self-cleaning coating compositions, and an aqueous solvent for dissolving the organic materials. In the Japanese Publication No. 47-17832, the binder is glassy frit materials. U.S. Pat. No. 3,460,523, discloses the use of silicates as the binder in the form of aqueous solutions.

In these prior art references, a disadvantage is that the surfaces on which the conventional self-cleaning coating compositions are formed must be completely and specially treated to prevent the self-cleaning coating compositions from being shed therefrom.

OBJECTS AND SUMMARY OF THE INVENTION

Accordingly, it is a primary object of the present invention to provide improved self-cleaning coating compositions.

It is another object of the present invention to provide improved self-cleaning coating compositions which may be easily formed on surfaces of any cooking apparatus.

It is a further object of the present invention to provide improved self-cleaning coating compositions which adhere to surfaces of any cooking apparatus, where a desired strength, hardness, abrasion resistance and toughness of the coating film are obtained.

It is another object of the present invention to provide an improved self-cleaning coating composition for application to a surface which includes an organic solvent whereby the solvent functions as a solvent for the silicone synthetic resin and whereby the solvent exerts a cleaning action on said substrate.

It is another object of the present invention to provide a coating composition which may be coated onto a variety of heat stable substrates such as metal plates, and interior oven surfaces.

The silicone synthetic resin self-cleaning coating composition contains at least three ingredients, i.e., a silicone synthetic resin, a heat stable oxidation catalyst and a solvent. The coating composition usually also includes carrier particles for the oxidation catalyst. However, the coating composition may also include various other additives such as bentonite or the like, and/or various other assistants such as powered silica filler or the like.

Various types of silicone synthetic resins such as straight silicon synthetic resins, silicone synthetic resin intermediate products and modified silicone synthetic resins are useful in accordance with the teachings of the present invention. The silicon synthetic resins must be able to be formulated into a composition which can be easily coated onto a surface. The silicone synthetic resins must also be able to effectively bind oxidation catalyst particles and must be able to form a hard stable carbonized coating after exposure to carbonizing conditions.

The straight or unmodified silicone synthetic resins are silicone synthetic resins which are not polymerized, blended or mixed with any other non-silicone synthetic resin. This is a type of primary polymer. These resins may also be referred to as pure and non-blended silicone synthetic resins. These resins have various types of organic groups such as lower alkyl, preferably methyl, or aryl, preferably phenyl, groups each of which is connected to a silicone atom. Specific examples are methyl synthetic silicone resins where the organic group connected to each of silicon atoms is primarily methyl or methyl only and phenymethyl synthetic silicone resins where the organic groups connected to each of silicone resins are methyl or phenyl. The latter type of silicone synthetic resin may be represented by the following formula:

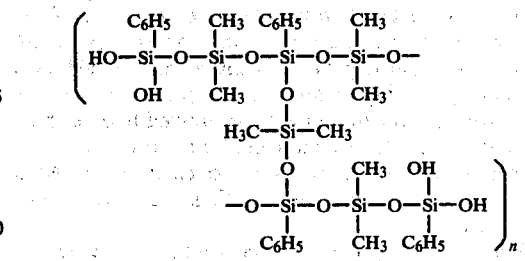

The silicone intermediate products may be identified as low molecular weight silicone synthetic resins having functional groups such as a lower alkoxyl group, such as methoxyl, or a hydroxyl group connected to the end of a molecule. These silicone intermediate products usually have a molecular weight between about 1,000 and about 1,500. The silicone intermediate products may be blended with non-silicone polymers such as polyesters, polyolefins, epoxy, alkyd, acryl, urethane, melamine, phenol, or the like. The silicone intermediate products may also be blended with other non-silicone intermediate products such as low molecular weight polymers, prepolymers and the like.

The modified silicone synthetic resins may be a straight silicon synthetic resin which is blended with another polymer such as a polyester, a polyolefin, an epoxy, an alkyd, ester, acryl, urethane, melanine, phenol, or the like.

These modified silicone synthetic resins may also be copolymers obtained by copolymerizing a silicon synthetic resin monomer or a silicon intermediate product with another monomer such as an epoxy, an alkyd, ester, acryl, urethane, melanine, phenol, or the like. The weight of the non-silicon component of the silicone synthetic resin should not exceed about 1.8 times the weight of the silicon component of the resin. Modified silicon synthetic resins which contain at least 20%, preferably between about 50 and 90%, of the silicone synthetic resin component are preferred.

One example of a modified silicone synthetic resin is a silicone resin copolymerized with epoxy which can be represented as follows:

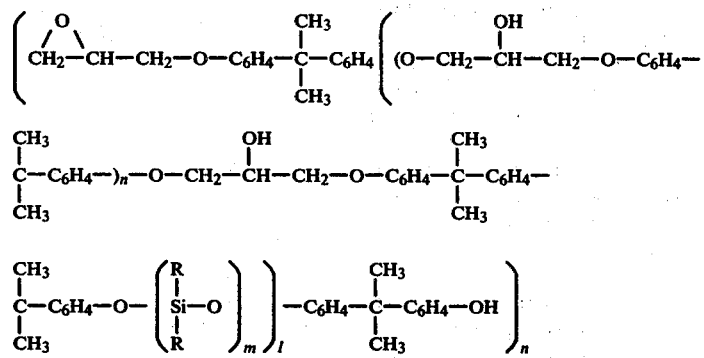

wherein m is an integer between about 2 and 80, 1 is between about 10 and 20, and n is between about 0 and 12.

Blending methods such as the cold blending method which is normally used for preparing only the blend of the straight synthetic resin and the other synthetic resin or the heat blending method which is normally used for effecting a copolymerization reaction between the straight synthetic resin or silicone intermediate product and other synthetic resin may be used. Any one of the above resins or mixtures thereof may be used as a solution in a suitable organic solvent when applied as a self-cleaning coating material of the present invention. Many types of silicone resins are examined to determine whether they can be used as a binder material for bonding oxidization catalyst particles to each other. As a result, it is found that most of them can satisfy this requirement.

When the resin blended or copolymerized with the straight silicone resin does not have in its main chain a group such as "-TiO-", "-AlO-" or "-SiO$_2$-" like silicone resin copolymerized with epoxy or silicon resin copolymerized with alkyds, it is preferable that the weight of the resin blended should not exceed about 1.8 times the weight of straight-silicone resin.

Various types of organic solvents are useful in accordance with the teachings of the present invention. The solvents are preferably non-aqueous solutions. Useful solvents include alcohols such as methanol, ethanol, iso-propanol butanol, diacetone alcohol, ethers such as diethyl ether, dioxane, and butyl cellosolve, aromatic solvents such as benzene, toluene, xylene, ketones such as acetone, methyl ethyl ketone (MEK), chloroform, carbontetrachloride, or the like.

The preferred solvents are toluene, Xylene, diacetone alcohol, butyl cellosolve or the like. While the above solvents have been given as examples of solvents which might be useful, any solvents which can effectively disperse the various components of the silicone synthetic resin composition to form a coatable composition may be used. The silicone synthetic resin composition contains between about 50 and 70 weight % of the organic.

The oxidation catalyst is any heat stable oxidation catalyst which can effectively oxidize fats, oils, grease and other materials which fall onto the self-cleaning coating film during cooking. The oxidation catalyst may be any compound which meets the above requirements such as a metal or a metal oxide or mixtures thereof. Noble metals such as palladium and platinum are preferred. Examples of useful metals are cobalt, manganese, iron, copper, nickel, or the like, with a surface area in excess of 0.1 square meter per gram. Oxides of the above metals are also useful. Examples of useful metal oxides are manganese dioxide, copper oxide, iron oxide, nickel oxide, chrome oxide, titanium oxide, cobalt oxide, or the like.

The metals and metal oxides are preferably in the form of particles having an average particle diameter between about 10 and 200$\mu$, preferably between about 50 and 70$\mu$. The oxidation catalyst is present in the silicon synthetic resin composition in an amount between about 0.1 and 50 weight %, preferably between about 0.1 and 30 weight %.

The coating composition will also usually include carrier particles for the oxidation catalyst particles. These carrier particles are preferably made of a heat stable powdery material such as alumina(Al$_2$O$_3$), cordierite(2MgO.2Al$_2$O$_3$.5SiO$_2$), mullite (3Al$_2$O$_3$.2SiO$_2$) etc. The diameter of these carrier particles is on the order of about 40–300$\mu$, preferably 40–200$\mu$. The powder is utilized for expanding the surface area over which the oxidation catalyst particles are dispersed. The carrier particles should be present in the silicone synthetic resin coating composition in an amount up to about 70% by weight, preferably between about 30 and 70 weight %, most preferably between about 50 and 60 weight %.

To achieve the above objects, pursuant to an embodiment of the present invention, a self-cleaning coating film is formed using a self-cleaning coating composition including a heat-stable oxidation catalyst mixed within a composition including silicone synthetic resin and an organic solvent. The oxidation catalyst includes at least one member selected from a metal such as a noble metal, a metal oxide such as manganese dioxide, copper oxide, iron oxide, nickel oxide, chrome oxide, and the like. The metal or metal oxide is blended with powder made of alumina etc. in the range of about 0.1 to 1.0 weight % to form a mixed powder. The diameter of the particles in the powder is in the order of about 40–300$\mu$. The mixed powder is mingled within the composition in the range of about 5 to 95 weight %, preferably between about 50 and 95 weight %.

The metal oxide is combined into the composition in about 50 weight %. The self-cleaning coating film is formed about 40 to 300$\mu$ in thickness.

The thus formed self-cleaning coating film is exposed to an elevated temperature of about 300° to 400° Centigrade for about 5 to 10 minutes, whereby the silicon synthetic resin is carbonized to form a film of $SiO_2$.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Conventional painting materials in which an appropriate oxidation catalyst of the present invention is mixed will be described first. These painting materials have thermostable components which are thermostable up to 600° Centigrade. These painting materials are in the form of organic solutions as summarized in Table 1 below.

TABLE I

|  | Components | Weight % Sample 1 | Weight % Sample 2 |
|---|---|---|---|
| Binder or Bonding Material | Silicone Synthetic Resin | 40 | 38.1 |
| Pigment | Black Pigment | 25*1 | 24.5*2 +10.3*3 |
| Additive | Assistant*4 | 25 | 18.7 |
| Solvent | Organic*5 Solvent | 10 | 8.4*6 |

*1: A composition of powder made of at least one metal material selected from Co, Mn, Fe, Cu, Ni and the like and powder made of metal oxide materials
*2: A black powder made of metal oxide
*3: Mica
*4: Compositions of a kind of silicate in the form of organic solvents
*5: Agents selected from ketones, xylole, toluene alcohol and the like
*6: Agents made of xylone and the like The various components of the composition, except for the organic solvent, have heat-stable properties.

The following examinations were carried out to select useful oxidation catalysts added to the painting materials of Table 1.

Preliminary Examinations

Mixed oil of 60 weight % and one of the following oxidation catalysts at 40 weight % were kneaded together. The mixed oil includes 10% butter, 20% corn oil, 10% fish oil, 20% beef oil, 20% horsebean oil, 20% soybean oil, all units being weight %. The tested oxidation catalysts were preliminary heated at about 500° centigrade for about an hour.

Compositions made of the mixed oil and the tested oxidation catalysts were coated on a heat-stable glass substrate at a thickness of about 30 μm, which were heated at about 250° centigrade for about one hour.

Standard of Judgement

After the heating at about 250° centigrade for about one hour, the evaporation ratio of the mixed oil was determined. The evaporation ratio is represented by the equation:

evaporation ratio (%) =

$$\frac{\text{decreased weight of the composition}}{\text{total weight of the mixed oil to be used}} \times 100$$

It can be considered that the data of the evaporation ratio over 100% are derived from the facts that oxygen and the like included within the oxidation catalysts was evaporated. The data having a considerably small evaporation ratio can be throught due to a small degree of evaporated mixed oil.

Results of Preliminary Examination

The following evaporation ratios were obtained for the respective oxidation catalysts to determine whether they are appropriate for the present invention.

TABLE 2

| Tested Oxidation Catalysts | Evaporation Ratio (%) |
|---|---|
| Ziroconium | 33.2 |
| Titanium oxide | 23.8 |
| vanadium | 21.3 |
| chromium | 12.4 |
| manganese dioxide | 126.5 |
| nickel oxide | 123.7 |
| iron oxide | 30.3 |
| cobalt oxide | 10.8 |
| tungsten oxide | 18.4 |
| molybdenum oxide | 12.3 |
| copper oxide | 14.8 |
| zinc oxide | 12.6 |
| 0.5% palladium | 81.4 |
| 0.2% platinum | 86.9 |

According to the results of the preliminary examination, the oxidation catalysts of the present invention should be selected from a noble metal material such as palladium, platinum and the like, and an oxided metal material such as manganese oxide, nickel oxide and the like. The noble metals can be utilized in a simple body or in a mixed form with each other and/or with the metal oxide material. The metal oxide materials can also be used in a mixed form with each other.

The following examples are presented in detail to show the products, processes and uses of the present invention.

EXAMPLE 1

The painting materials as shown in Table 1 are utilized for this example. The painting materials to be applied include solid bodies of about 50 to 80 weight % which is represented by an amount of the residue after heating at about 250° centigrade for about 3 hours. The silicone synthetic resin and the organic solvent can be dissipated by evaporation.

Within the painting materials, there is uniformly mixed a volume of powder comprising carrier particles of about 40 to 300μ diameter. The powder permeates or holds by coating a material of platinum in about 0.1 to 1.0 weight %.

It is preferable that the powder containing the oxidation catalyst be mingled with the painting material at 1:2 in the ratio of weight. Other ratios such as 1:1, 1:3 and 1:4 of the powder within the painting materials are also acceptable. Besides Pt, a metal material such as palladium, ferrite and like is acceptable for the oxidation catalyst.

Self-cleaning coating compositions of the present invention are obtained as described above. Coating processes for the present self-cleaning coating compositions are specified as follows:

A substrate to be coated with the present self-cleaning coating compositions is initially prepared. The substrate is preferably a plate made of cold rolled steel plate (SPCC steel plate), a steel plate gilded by aluminum or zinc metal, a stainless steel plate, iron casting and the like. The substrate is defatted with a suitable organic solvent or by means of emulsion methods with the aid of weak alkaline or neutral reagents. The substrate is washed and then dried after the oil extraction or defatting.

Thereafter, the present self-cleaning coating compositions which are adjusted with a suitable organic solvent such as ketone, xylole, toluene, alcohol, and the like are coated on the substrate. A coated film from about 40 to 300μ thickness, preferably about 150 to 250μ thickness, is obtained by a procedure wherein the spraying method, the drying process and the baking process are each carried out only once.

Another coated film from about 100 to 200μ thickness is derived by a procedure wherein a sequence of the spray method and then the drying process is repeated twice, and thereafter the baking process is performed.

It is required that the oxidation catalyst particles be exposed or appear from the painting material, especially, the silicone synthetic resin in an amount enough to be effective.

To this end, the silicone synthetic resin is baked for carbonization purposes by disposing the coated film within a furnace heated at about 300° to 400° centigrade for about 5 to 10 minutes whereby the silicone synthetic resin is converted into a $SiO_2$ film. The coated film thus obtained is porous, has a good reliability in obtaining desired strength, hardness, adhesion and is tough enough to provide good catalytic activity. There is no problem, even with insufficient defatting because of the utilization of the organic solvent.

The results in Table 3 below were obtained by a test wherein salad oil was sprinkled over a film made of the present self-cleaning coating compositions which was coated on surfaces of a cooking apparatus, for example, a gas oven. The sprinkled salad oil was dried and fixed at about 150° to 200° centigrade. Self-cleaning properties were examined in such a manner and the gas oven was intermittently operated to provide heat of a temperature of about 300° to 400° centigrade for about 20 hours.

An example of a coated film made of the present self-cleaning coating compositions formed on the surfaces of a gas oven is as follows, a steel plate gilded by aluminum layers is utilized for oven surfaces of a gas oven. On the aluminum layer, there is formed a coated film made of the present self-cleaning coating compositions preferably in the range from about 40 to 300μ thickness.

TABLE 3

| Experiment | Self-Cleaning Coating Compositions | Evaluation |
| --- | --- | --- |
| 1 | Powder made of alumina comprising particles of 74 to 297μ diameter containing 0.2% Pt [Mixed Ratio] Painting Materials including the solid bodies of about 50 to 60 weight %: Powder = 2:1 (The mixed ratio is common to all the experiment except for Experiment 4) | ◉ ~ O |
| 2 | Powder made of alumina comprising particles of 44μ to 74μ diameter containing 0.2% Pt | ◉ ~ O |
| 3 | Powder made of alumina comprising particles of 40μ diameter containing 0.5% Pt | ◉ |
| 4 | Only the painting materials listed in Examples 1 and 2 of Table 1 | X |
| 5 | Powder made of ferrite comprising particles of 74 to 297μ diameter containing metal oxide | Δ ~ O |
| 6 | Powder made of ferrite comprising particles of 44 to 74μ diameter containing metal oxide | Δ ~ O |

◉: very superior
O: considerable efficiency
Δ: a little efficiency
X: no efficiency

EXAMPLE 2

The painting material of Table 1 for containing the oxidation catalyst powder of the present invention is replaced by that of Table 4. The kind of the compositions of Table 4 is not changed, only the ratio of the compositions utilized is modified.

TABLE 4

| Compositions | | Weight % |
| --- | --- | --- |
| Binder | Silicone Synthetic Resin | 40 |
| Pigment | Black Pigment (common to that of sample 1 of Table 1) | 25 |
| | Mica | 10 |
| Addition | Assistant | 15 |
| Solvent | Organic Solvent | 10 |

The painting materials shown in Table 4 include a ratio of the solid bodies of about 60 to 80 weight %. Within the painting materials of this type, there is uniformly combined a certain amount of the powder comprising the particles in the range of about (60±20)μ diameter. The powder is made of the same aluminum compound as in Example 1. The powder contains, or carries by means of a coating, a platinum material in the ratio of about 0.1 to 0.5 weight %. An example of the present self-cleaning coating materials in this example is thus obtained.

The coating process for the self-cleaning coating materials of this type is repeated in the same manner as Example 1. The coated film by the self-cleaning coating materials of this type is formed in the range of about 40 to 120μ thickness through the use of the process wherein each of the spray method, the drying process, and the baking process therefor are performed only once. It is preferable that the coated film be mounted on the surface of a substrate in the range of about 40 to 300μ thickness.

The following samples are obtained using a powder made of alumina, the particles of which being about 40μ diameter. The powder contains 0.5% Pt or 0.2% Pt in the range of about 0.1 to 0.5 weight %. The painting materials used contain a ratio of the solid bodies of about 60 weight %. The powder is blended into the painting materials in the range of about 2, 5, 8, 12, 15 and 20 weight %, respectively.

TABLE 5

| Contents (weight %) | Alumina Powder containing 0.2% Pt | Alumina Powder containing 0.55% Pt |
|---|---|---|
| 2 | Δ-X | Δ |
| 5 | Δ-O | O |
| 8 | O | ⊙ |
| 12 | ⊙ | ⊙ |
| 15 | ⊙ | ⊙ |
| 20 | Δ-O | Δ-O |
| nil | X | X |

⊙: very superior
O: enough efficiency
Δ: a little efficiency
X: no efficiency

The results listed in Table 5 were obtained by an examination wherein an amount of salad oil, for example, 3 cc was sprinkled over a surface of the gas oven on which the present self-cleaning coating film was formed. The gas oven was operated to provide heat of about 250° to 300° centigrade for about 8 hours, which is a usual temperature for gas ovens. The above stated data was obtained after the operation of the gas oven in such a manner.

As apparently noted from Table 5, the powder containing Pt as the oxidation catalyst should be mixed with the painting material in the range of about 5 to 20 weight %. This kind of the powder contributes to the enhancement of the self-cleaning characteristics and the persistence of the coating film.

Another kind of the powder having Pt below 5 weight % is not contributive to enhancing the self-cleaning characteristics although there is the persistence.

In addition to Pt, a noble metal material such as palladium (Pd) is preferable for the oxidation catalyst of the present invention, the powder such as alumina containing the noble metal material being contained within the painting material in the order of about 5 to 20 weight %.

EXAMPLE 3

In this instance, the painting materials are utilized in the same compositions as in Table 1 and Table 4. Various oxidation catalysts are blended within the painting materials as summarized in Table 6. The evaporation ratio (%) defined above is determined by sprinkling a volume of the salad oil, say, about 5 cc over the self-cleaning coating film of the present invention. The self-cleaning coating film mounting the volume of the salad oil is heated at about 250° centigrade for about 1 hour.

TABLE 6

| Mixing ratio of a material containing oxidation catalyst to painting material (weight %) | The material | Evaporation Ratio (%) | Evaluation |
|---|---|---|---|
| Painting material: the material (common in hereinafter) = 2:1 | Alumina powder containing 0.2% Pt | 42 | ⊙ |
| 3:1 | The same | 36 | O |
| 2:1 | Alumina powder containing 0.5% Pt | 44 | ⊙ |
| 2:1 | Alumina powder containing 0.5% Pd | 32 | O |
| 2:1 | manganese dioxide | 38 | O |
| 2:1 | nickel oxide | 33 | O |
| 2:1 | copper oxide | 18 | X |
| 2:1 | iron oxide | 24 | Δ |
| 2:1 | manganese dioxide and nickel oxide (the same amount in weight as common hereinafter) | 44 | ⊙ |
| 2:1 | manganese dioxide and copper oxide | 33 | O |
| 2:1 | manganese dioxide and iron oxide | 36 | O |
| 2:1 | copper oxide and iron oxide | 18 | X |

⊙: very superior (evaporation ratio above 40%)
O: enough efficiency (evaporation ratio between 30 and 40%)
Δ: a little efficiency (evaporation ratio between 20 and 30%)
X: no efficiency (evaporation ratio below 20%)

The particles of the alumina powder used have the same diameter as described above. The self-cleaning coating films are formed in about 200μ thickness.

As noted from Table 6, a certain metal oxide such as manganese dioxide, nickel oxide, and the like is appropriate as the oxidation catalyst and there is no need to mix a powder such as alumina with the same Chrome oxide is also available. Compositions combined with at least two kinds of the metal oxide are also useful in the present invention.

The present self-cleaning coating compositions as specified in Examples 1 to 3 can be applied to any cooking apparatus such as an electric oven, a gas oven, a microwave oven, especially, for providing elevated temperatures, a combined cooking apparatus including at least two kinds of heating sources, and the like. As an example, a combined microwave oven and electric oven, the surfaces of which carry the self-cleaning coating film of the present invention may be utilized.

The combined cooking apparatus comprises a housing containing a magnetron, interior surfaces an upper heater and a lower heater.

There may further provided a wave guide a cover for the wave guide a bottom wall a plate for carrying a foodstuff an oven door.

The silicone synthetic resin to be used for the present invention includes at least one member selected from straight silicone resins, silicone resins copolymerized with alkyds, silicon resins copolymerized with epoxy, and silicone resins copolymerized with acrylics.

The preparation and properties of various coating materials are described below:

| COATING MATERIAL | | |
|---|---|---|
| Components | Example | Weight % |
| binder | silicone synthetic resin copolymerized with epoxy* | 15 |
| catalyst | MnO$_2$ | 30 |
| assistant | powdered silica | 30 |
| additive | Bentonite | 10 |
| organic solvent | Butyl cellosolve Xylene Diacetone alcohol | 15 |

*Any of ES-1001 and ES-1004 (Shin-Etsu Chemical Co., Ltd.) and TSR-194 (Toshiba Silicon, Ltd.)

While the ratio of the examples mixed is maintained, each of the examples of binder and other agents can be replaced by an suitable material according to the teaching of the present invention. The following data are obtained under such a modification.

The respective coating materials are prepared by such a replacement. Each of them is coated on a suitable plate, preferably, a steel plate gilded with an aluminum film of about 200 to about 250 μm in thickness. Pre-baking of this film is carried out at about 80° centigrade for about 15 minutes. Further, the film is baked at about 400° centigrade for about 15 minutes.

2. Examination Method 2-1. Hardness Examination: The peripheral edge of a copper coin is stressed under a load of about 1 kg for a travel of about 0.5 m directly on the surface of the above described film.
Judgement
  ◎ no scratch
  O scratch less than about 5% of the travel
  Δ scratch less than about 30% of the travel
  x scratch more than about 30% of the travel 2-2. Adherence Examination: On the surface of the coated film 36 squares having a side of about 5 mm are formed in a checker format by a cutter. The depth of respective grooves formed reach the surface of the steel plate from the surface of the coated film. Broken pieces of the film at the groove crossing points are measured with the eye.
Judgement
  ◎ no pieces
  O a small diameter and a small amount of broken pieces
  Δ a small diameter and a large amount of broken pieces
  x a large diameter and a large amount of broken pieces 2-3. Examination of Alkali Resistivity: a 3% NaOH solution is heated up to about 40° centigrade and the plate coated with the resin is soaked for about 3 hours. Thereafter, the sample is removed from this solution and the properties thereof judged.
Judgement
  ◎ no change
  O a slight discoloration
  Δ a small chalking on the surface of the film
  x removal of the film on the substrate

3. Result of Examination 3-1. Straight synthetic silicon resin
  H: hardness examination
  Ad: adherence examination
  A: examination of alkali resistivity

| Kind of resin | Example of resin (commercial name) | manufacturer of resin | H | Ad | A |
|---|---|---|---|---|---|
| methyl silicone | KR-220 | Shin-Etsu Chemical Co., Ltd. | ◎ | O | Δ |
| methyl silicone | XR-3370 | Toshiba Silicone Co., Ltd. | ◎ | O | Δ |
| methyl silicone | RHODORSIL RESIN 10336 | Dainippon Ink & Chemicals, Inc. | ◎ | O | Δ |
| phenylmethyl silicone | SH-804 | Toray silicone Company, Ltd. | ◎ | O | O |
| phenylmethyl silicone | TSR-117 | Toshiba Silicone Co., Ltd. | O | ◎ | ◎ |
| phenylmethyl silicone | TSR-145 | Toshiba Silicone Co., Ltd. | ◎ | O | O |
| phenylmethyl silicone | KR-282 | Shin-Etsu Chemical Co., Ltd. | O | ◎ | ◎ |
| phenylmethyl silicone | RHODORSIL RESIN 6405 | Dainippon Ink & Chemicals Inc. | O | O | O |
| phenylmethyl silicone | BAYSILONE RESIN P-150K | Bayer Aktiengesellschaft | O | O | O |

(2) Silicon Intermediate Product

| Example of resin (commercial name) | Manufacturer of resin | H | Ad | A |
|---|---|---|---|---|
| TSR-160 | Toshiba Silicone Co., Ltd. | O | O | O |
| DR-216 | Shin-Etsu Chemical Co., Ltd. | O | O | O |

(3) Modified Silicone Synthetic Resin

| Kind of resin | Example of resin (commercial name) | Manufacture of resin | H | Ad | A | Silicon resin weight ratio | Organic resin weight ratio |
|---|---|---|---|---|---|---|---|
| silicone resin copolymerized with alkyds | TSR-180 | Toshiba Silicone Co., Ltd. | Δ | ◎ | Δ | 1 | 1 |
| silicone resin copolymerized with alkyds | SA-4 | Shin-Etsu Chemical Co., Ltd. | Δ | ◎ | Δ | 1 | 1 |
| silicone resin copolymerized with polyester | TSR-187 | Toshiba Silicone Co., Ltd. | Δ | O | Δ | 1 | 1 |
| silicone resin copolymerized with polyester | AY-42-001 | Toray Silicone Company Ltd. | Δ | O | Δ | 1 | 1 |
| silicone resin copolymerized with polyester | UD-125 | Bayer Aktiengesellschaft | Δ | O | Δ | 1 | 1 |
| silicone resin copolymerized with acryl | KR-3093 | Shin-Etsu Chemical Co., Ltd. | Δ | O | Δ | 1 | 1 |
| silicone resin copolymerized with acryl | TSR-170 | Toshiba Silicone Co., Ltd. | Δ | O | Δ | 1 | 1 |
| silicone resin copolymerized with acryl | SE-653 | Mitsubishi Rayon Co., Ltd. | Δ | O | Δ | 1 | 1 |
| silicone resin copolymerized with urethane | TSR-175 | Toshiba Silicone, Ltd. | Δ | O | Δ | 1 | 1 |
| silicon resin | ES-1001 | Shin-Etsu Chemical | O | O | O | 4 | 6 |

| | | | | | | |
|---|---|---|---|---|---|---|
| copolymerized with epoxy | | Co., Ltd. | | | | | |
| silicon resin copolymerized with epoxy | ES-1004 | Shin-Etsu Chemical Co., Ltd. | O | O | O | 4 | 6 |
| silicon resin copolymerized with epoxy | TSR-194 | Toshiba Silicone, Ltd. | O | O | O | 4 | 6 |
| silicone resin copolymerized with melanine | TSR-145 80 w % L-109-65 20 w % | Toshiba Silicone, Ltd. Dainippon Ink & Chemicals Inc. | O | O | △ | 8 | 2 |
| silicone resin copolymerized with melanine | TSR-160 70 w % YUBAN 220 30 w % | Toshiba Silicone Co., Ltd. Mitsui Toatsu Chemicals, Inc. | O | O | △ | 7 | 3 |
| silicone resin copolymerized with phenol | TSR-145 60 w % CKM-908 40 w % | Toshiba Silicone Co., Ltd. Showa Union Co., Ltd. | O | ◎ | O | 6 | 4 |
| silicone resin copolymerized with phenol | TSR-145 40 w % phenol resin 60 w % | Toshiba Silicone Co., Ltd. Dainichi-seika Color & Chemicals Mfg. Co., Ltd. | O | ◎ | O | 4 | 6 |

A temperature at which resin material carbonizes by baking is within about 320° to about 500° C., more preferably within about 370° to about 420° C. In connection with heat stability, a temperature at which the coated resin film is resistant is below several tens degree centigrade, more preferably, about 30° C. than the temperature for the carbonization baking. The assistant functions only to enlarge the total mass of the resin material. Any suitable material of the assistant except powered silica may be selected.

While only certain embodiments of the present invention have been described, it will be apparent to those skilled in the art that various changes and modifications may be made therein without departing from the spirit and scope of the invention as claimed.

What is claimed is:

1. A composition for a self-cleaning coating which catalytically oxidizes and removes fats and oils deposited on said coating, comprising:
    (a) at least one silicone synthetic resin binder selected from the group consisting of straight silicone resins, silicone resins copolymerized with alkyds, silicone resins copolymerized with epoxy, and silicone resins copolymerized with acrylics;
    (b) an organic solvent; and
    (c) a thermostable oxidation catalyst mixed within said silicone synthetic resin and said organic solvent.

2. The self-cleaning coating composition according to claim 1, wherein said oxidation catalyst includes at least one oxidation catalyst material selected from a metal material and a metal oxide.

3. The self-cleaning coating composition according to claim 2, wherein said metal material comprises a noble metal.

4. The self-cleaning coating composition according to claim 3, wherein said noble metal is Pt or Pd.

5. The self-cleaning coating composition according to claim 2, wherein said metal oxide is selected from the group consisting of manganese oxide, copper oxide, iron oxide, nickel oxide and chrome oxide.

6. The self-cleaning coating composition according to claim 5, wherein said metal oxide is manganese dioxide or nickel oxide.

7. The self-cleaning coating composition according to claim 1, wherein said thermostable oxidation catalyst comprises ferrite.

8. The self-cleaning coating composition according to claim 2, wherein said metal material is mixed with a powder of an aluminum compound.

9. The self-cleaning coating composition according to claim 8, wherein said aluminum compound is selected from the group consisting of alumina, cordierite and mullite.

10. The self-cleaning coating composition according to claim 8, wherein said metal material and said powder are mixed together and are then mixed in the composition in the range of 5 to 20 weight %.

11. The self-cleaning coating composition according to claim 10, wherein said metal material contained within said powder is in the range of about 0.1 to 1.0 weight %.

12. The self-cleaning coating composition according to claim 10, wherein the diameter of the particles of said powder is in the order of about 40 to 300μ.

13. The self-cleaning coating composition according to claims 11 or 12, wherein the powder containing the metal material as the oxidation catalyst is blended within a composition including the silicone synthetic resin and the organic solvent in the range of about 5 to 100 weight %.

14. The self-cleaning coating composition according to claims 11 or 12, wherein the powder containing the metal material as the oxidation catalyst is blended within a composition including the silicone synthetic resin and the organic solvent in the range of about several tens weight %.

15. The self-cleaning coating composition according to claim 5, wherein the metal oxide is blended within a composition containing the silicone synthetic resin and the organic solvent in the range of about 50 weight %.

16. The self-cleaning coating composition according to claim 5, wherein the metal oxide includes two types of metal oxide.

17. A self-cleaning coating film according to claim 1, wherein said oxidation catalyst is thermostable up to 600° C.

18. The self-cleaning coating film according to claim 17, wherein the self-cleaning coating film is exposed to an elevated temperature of about 300° to 400° Centigrade so that the silicone synthetic resin film is carbonized to form a film of SiO₂.

19. The self-cleaning coating film according to claim 18, wherein the self-cleaning coating film is exposed to said elevated temperature for 5 to 10 minutes.

20. The self-cleaning coating film according to claim 18, wherein the weight of the film after heating is 50–80% of the weight before heating.

21. A self-cleaning coating film made from the composition according to claim 1, having a thickness of about 40 to 300μ.

22. A self-cleaning coating composition, comprising: a silicone synthetic resin selected from the group consisting of straight silicone synthetic resin, silicone intermediate products, modified silicone synthetic resin and mixtures thereof; a heat stable oxidation catalyst and an organic solvent.

23. The self-cleaning coating composition according to claim 22, and further including inorganic carrier particles for said oxidation catalyst.

24. The self-cleaning coating composition according to claim 22, wherein said silicone synthetic resin is present in the range of about 30 to 80 weight %.

25. The self-cleaning coating composition according to claim 22, wherein said oxidation catalyst is present in the range of about 0.1 to 50 weight %.

26. The self-cleaning coating composition according to claim 22, wherein said organic solvent is present in the range of about 5 to 30 weight %.

27. The self-cleaning coating composition according to claim 23, wherein said oxidation catalyst is present in the range of about 0.1 to 12 weight % and said carrier particles are present in the range of about 5 to 50 weight %.

28. The self-cleaning coating composition according to claim 22, wherein said silicone synthetic resin contains lower alkyl and aryl groups.

29. The self-cleaning coating composition according to claim 22, wherein said silicone synthetic resin contains methyl and phenyl groups.

30. The self-cleaning coating composition according to claim 22, wherein said silicone synthetic resin comprises recurring units of the following formula:

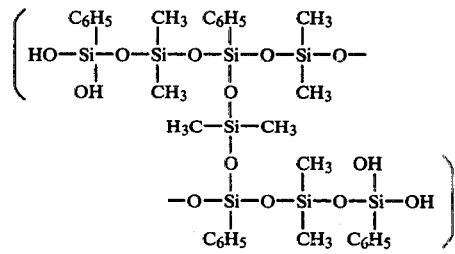

31. The self-cleaning coating composition according to claim 22, wherein said silicone synthetic resin is a silicone resin copolymerized with epoxy.

32. The self-cleaning coating composition according to claim 22, wherein said silicone synthetic resin is a silicone resin copolymerized with epoxy represented by the following formula:

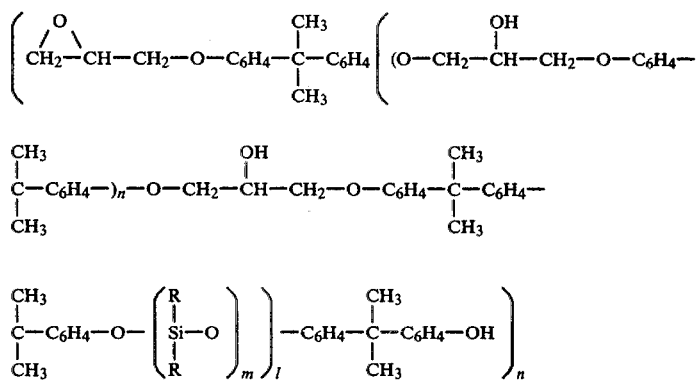

wherein m is an integer between 2 and 80, l is between about 10 and 20 and n is between about 0 and 12.

33. The self-cleaning coating composition according to claim 22, which comprises silicone intermediate products having a molecular weight between about 1000 and 1500.

34. The self-cleaning coating composition according to claim 22, wherein said silicone synthetic resin comprises silicone intermediate products blended with non-silicone polymers.

35. The self-cleaning coating composition according to claim 22, wherein the silicone synthetic resin comprises a non-silicone component and wherein said non-silicone component of the silicone synthetic resin does not exceed about 1.8 times the weight of the silicone component of the resin.

36. The self-cleaning coating composition according to claim 22, wherein said silicone synthetic resin comprises methyl silicone.

37. The self-cleaning coating composition according to claim 22, wherein said silicone synthetic resin comprises silicone resin copolymerized with alkyds.

38. The self-cleaning coating composition according to claim 22, wherein said silicone synthetic resin comprises silicone resin copolymerized with polyester.

39. The self-cleaning coating composition according to claim 22, wherein said silicone synthetic resin comprises silicone resin copolymerized with acryl.

40. The self-cleaning coating composition according to claim 22, wherein said silicone synthetic resin comprises silicone resin copolymerized with urethane.

41. The self-cleaning coating composition according to claim 22, wherein said silicone synthetic resin comprises silicone resin copolymerized with epoxy.

42. The self-cleaning coating composition according to claim 22, wherein said silicone synthetic resin comprises silicone resin copolymerized with melamine.

43. The self-cleaning coating composition according to claim 22, wherein said silicone synthetic resin comprises silicone resin copolymerized with phenol.

44. The self-cleaning coating composition according to claim 22, wherein said heat stable oxidation catalyst is a metal or a metal oxide.

45. The self-cleaning coating composition according to claim 22, wherein said heat stable oxidation catalyst is a metal selected from the group consisting of cobalt, manganese, iron, copper and nickel.

46. The self-cleaning coating composition according to claim 22, wherein said heat stable oxidation catalyst is a metal selected from the group consisting of palladium or platinum.

47. The self-cleaning coating composition according to claim 22, wherein said heat stable oxidation catalyst is a metal having a surface area in excess of 0.1 square meter per gram.

48. The self-cleaning coating composition according to claim 46, wherein said heat stable oxidation catalyst has a surface area in excess of 0.1 square meter per gram.

49. The self-cleaning coating composition according to claim 47, wherein said heat stable oxidation catalyst is a noble metal.

50. A coating composition, comprising:

30 to 80% by weight of a silicone synthetic resin selected from the group consisting of straight silicon synthetic resin, silicone intermediate products, modified silicone synthetic resin and mixtures thereof;

0.1 to 50% by weight of a heat stable oxidation catalyst selected from the group consisting of a metal material, a metal oxide and mixtures thereof; and an organic solvent.

51. A coating composition according to claim 50, which comprises inorganic carrier particles for said oxidation catalyst.

52. A coating composition according to claim 51, wherein said oxidation catalyst is present in the range of about 0.1 to 1 weight % and said carrier particles are present in the range of about 5 to 50 weight %.

53. A composition for forming a self-cleaning coating which catalytically oxidizes and removes fats and oils deposited on said coating, comprising:

a silicon synthetic resin binder;

an effective amount of a thermostable oxidation catalyst selected from the group consisting of a metal material and a metal oxide;

inorganic carrier particles for said oxidation catalyst; and an organic solvent, said composition having a solids content of about 50 to 80 weight %.

54. The composition according to claim 53, wherein said inorganic carrier particles permeate or hold by coating said metal oxidation catalyst in an amount of 0.1 to 1.0 weight %.

* * * * *